(12) United States Patent
Lewis et al.

(10) Patent No.: US 6,711,550 B1
(45) Date of Patent: Mar. 23, 2004

(54) METHOD AND SYSTEM FOR CAPACITY PLANNING

(75) Inventors: L. Richard Lewis, Westland, MI (US); Lawrence H. Michalak, Birmingham, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/540,324

(22) Filed: Mar. 31, 2000

(51) Int. Cl.$^7$ .............................................. G06F 17/60
(52) U.S. Cl. ........................................ 705/10; 700/95
(58) Field of Search .............................. 705/10; 700/95

(56) References Cited

U.S. PATENT DOCUMENTS

| | | | |
|---|---|---|---|
| 4,887,208 A | * 12/1989 | Schneider et al. | 705/28 |
| 5,128,861 A | * 7/1992 | Kagami et al. | 705/10 |
| 5,299,115 A | * 3/1994 | Fields et al. | 705/10 |
| 5,440,480 A | * 8/1995 | Costanza | 705/8 |
| 5,699,259 A | * 12/1997 | Colman et al. | 700/99 |
| 5,712,985 A | * 1/1998 | Lee et al. | 705/7 |
| 5,765,143 A | * 6/1998 | Sheldon et al. | 705/28 |
| 5,771,172 A | * 6/1998 | Yamamoto et al. | 700/106 |
| 5,910,894 A | * 6/1999 | Pryor | 700/95 |
| 5,983,195 A | * 11/1999 | Fierro | 705/10 |
| 6,032,125 A | * 2/2000 | Ando | 705/10 |
| 6,205,431 B1 | * 3/2001 | Willemain et al. | 705/10 |
| 6,249,774 B1 | * 6/2001 | Roden et al. | 705/28 |
| 6,415,195 B1 | * 7/2002 | Gleditsch et al. | 700/99 |
| 6,470,324 B1 | * 10/2002 | Brown et al. | 705/28 |
| 2002/0077850 A1 | * 6/2002 | McMenimen et al. | 705/2 |

FOREIGN PATENT DOCUMENTS

| | | | |
|---|---|---|---|
| JP | 08163827 A | * 6/1996 | H02K/9/26 |

OTHER PUBLICATIONS

Schaffner, Karen. "Made to order beepers," Apparel Industry Magazine, Jul. 1994.*
Reese, Shelly. "Parts smarts: Triad uses demographics to help auto–parts suppliers stock up their shelves with inventory that sells," American Demographics, Jan./Feb. 1997.*

* cited by examiner

*Primary Examiner*—Romain Jeanty
*Assistant Examiner*—Catherine M. Colón
(74) *Attorney, Agent, or Firm*—Brooks Kushman PC; Carlos Hanze

(57) ABSTRACT

The present invention is a method and system for accurately forecasting the quantity of all parts necessary to assemble all vehicles of a vehicle product line for a predetermined time period. The method comprises inputting the available features and product rules for vehicle orders of the vehicle line into a computer data base, inputting sales forecasts for a first plurality of features of the vehicle line into the computer data base randomly generating a substantial sample of vehicle orders based on the features, product rules, and the feature sales forecasts, and determining the quantity of all parts necessary to assemble all vehicles of a vehicle product line for a predetermined time period based on the sample order.

18 Claims, 1 Drawing Sheet

METHOD AND SYSTEM FOR CAPACITY PLANNING

TECHNICAL FIELD

The present invention relates to a method and system for forecasting the quantities of parts necessary to assemble vehicles for a vehicle product line.

BACKGROUND ART

The automotive industry is unique in that the automobile manufacturers sell a variety of high volume, constantly changing, and highly complex products. Most of the major automobile manufacturers carry between ten to twenty lines of vehicles. Many of these vehicle lines sell on the order of hundreds of thousands of vehicles per year.

The parts necessary for each vehicle can vary significantly from vehicle to vehicle. To begin with, each vehicle line typically offers more than one model. Also, each model typically offers about a hundred customer choices available among standard and optional features. As such, the manufacturing of any given vehicle line can require thousands of different vehicle parts.

Adding to the complicated process of manufacturing vehicles is that the vehicle manufacturer uses hundreds of different part suppliers to supply it with the parts required to manufacture the vehicles of a vehicle line. In order for the parts suppliers to be able to supply the automobile manufacturer's assembly plants with the necessary parts at the necessary time, it is not uncommon for the parts supplier to require more than one year, and sometimes three or more years, of advanced notice of the parts and their volumes needed. Primarily, this is because the parts supplier requires a great deal of time to design and construct its parts manufacturing facilities. Thus, to provide reasonable assurance of being able to meet an automobile manufacturer's future parts needs, part suppliers need accurate information from the automobile manufacturer about expected shipping volumes usually between one to three years in advance of the actual assembly of the finished vehicles.

The actual parts necessary for each vehicle can only be determined after a vehicle is ordered. The parts are determined, in large part, from the features that the consumer selects for his vehicle. However, since the parts manufacturer needs advance notice of the parts and their quantities usually at least a year in advance of production of the vehicles and since customers do not wish to wait much longer than a week or so for their vehicle once ordered, it is not feasible to wait until the orders have been completed before alerting a parts manufacturer as to what parts are needed.

Typically a sales department can reliably forecast, based on sales histories or intended promotions, the expected sales proportions of the individual features of a vehicle line (e.g., 30% of the vehicles to be assembled will have the air-conditioner feature). Any part used solely when a single feature is selected (e.g., a part that is used solely on all vehicles with air conditioners) would therefore get a reliable forecast by simply making the part forecast agree with the feature forecast.

However, many parts are required when two or more features are selected. Even if all of the individual features for these types of parts have been forecasted, the method used to forecast the likelihood that the combination of features will be selected is not accurate. Typically, a "rate-on-rate" method is used. For parts requiring a combination of features, the forecasted percentages of these features are multiplied to ascertain the percent likelihood of the combination. This is done without taking any product rules (identification of restricted and required part combinations) into account. As such, these calculated estimates can, and tend to, be quite inaccurate.

Providing inaccurate information to the parts supplier can result in many problems. One problem, under estimating future demand, can result in lost sales for the automobile manufacturer because of insufficient capacity to supply parts needed for the assembly of vehicles. Another problem, resulting from over estimating demand is the loss associated with wasted facilities. Because of high volume frequently seen in the automotive industry, even the smallest miscalculation of future parts demand can translate into very large losses of capital.

Accordingly, what is needed is a method for accurately estimating the quantity of all the parts necessary for a vehicle product line at a time which is significantly in advance of the time that the parts are actually needed for assembly, and significantly in advance of receipt of any actual vehicle orders separated by vehicle customers.

DISCLOSURE OF INVENTION

Accordingly, it is an object of the present invention to provide a method for accurately forecasting the quantities of all the parts necessary for a vehicle product line. The method comprises inputting the available features and product rules for vehicle orders of the vehicle line into a computer data base, inputting sales forecasts for a first plurality of features of the vehicle line into the computer data base, randomly generating a substantial sample of vehicle orders based on the features, product rules, and the feature sales forecasts, and determining the quantity of all parts necessary to assemble all vehicles of a vehicle product line for a predetermined time period based on the sample order.

The present invention also provides a system for accurately and reliably forecasting the quantities of all the parts necessary for a vehicle product line. The system comprises a storage device operable to store permanent data, a memory device operable to store a computer program and temporary data, an input device operable to provide an interface with the system to input available features and product rules for vehicle orders of a vehicle line and sales forecasts for a first plurality of features for a vehicle line, an output device operable to provide an interface with the system to output the quantity of all parts necessary to assemble all vehicles of a vehicle product line for a predetermined time period parts available, and a processor coupled to the storage device, the memory device, and the input and output devices. The processor operates to execute the computer program such that the system is directed to randomly generate a substantial sample of vehicle orders based on the features, product rules and the feature sales forecasts, and determine the quantity of all parts necessary to assemble all vehicles of a vehicle product line for a predetermined time period based on the sample orders.

These and other objects will become more apparent from a reading of the detailed specification in conjunction with the drawing.

BRIEF DESCRIPTION OF DRAWINGS

The present invention will now be described in further detail, and by way of example, with reference to the accompanying drawings.

BEST MODE FOR CARRYING OUT THE INVENTION

Figure 1:
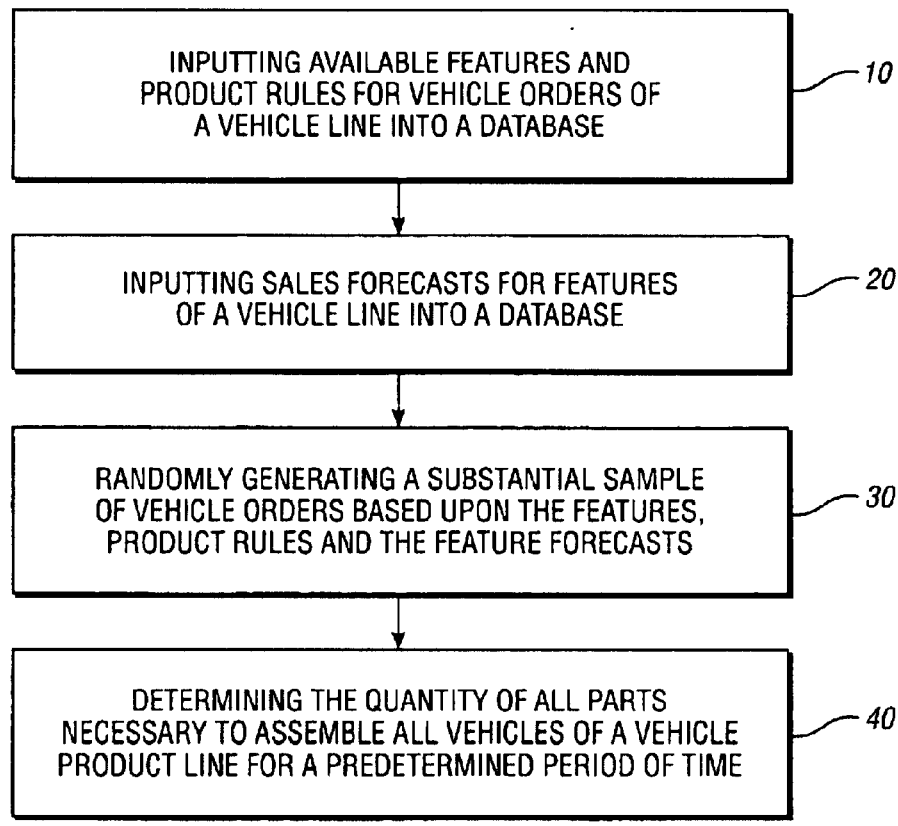
FIG. 1 illustrates a flowchart describing the general steps of the present invention.

Referring to FIG. 1, a flowchart outlining the general method of accurately estimating the quantities of all the parts necessary for a vehicle product line is illustrated. The method includes inputting the available features and the product rules for vehicle orders of a vehicle line into a computer database 10.

For each vehicle line there are a plurality of features that a consumer has available to him in choosing his vehicle, i.e. in filling out his vehicle order. Typically, a vehicle line can have anywhere between about 50–1000 features, and typically has between about 100–300 customer-selectable features. Examples of some typical feature options include vehicle model, body style, air conditioning or no air conditioning, 2-wheel drive or 4-wheel drive, engine size, transmission type, etc.

A vehicle order is what is made when a consumer selects all of the features that he desires his vehicle to have. It is a document, typically in paper form but could also be in electronic form, that is actually generated when a consumer selects all of his features. The automobile manufacturer uses a vehicle order as a set of instructions to build a vehicle for a customer.

A vehicle order consists of a selection from each of a plurality of families represented on the order. A family is a listing, or grouping, of all of the available selections with respect to a particular type of feature. Examples of typical families include, all of the countries a vehicle line is sold in, all of the models of a vehicle line for a particular country, air conditioning or no air conditioning, all of the engine types available for a vehicle model, etc. For an order to be complete, a selection must be made, either explicitly or implicitly, from each family. Essentially, each family on an order represents a selection that must be made to construct a vehicle.

In addition to comprising feature selections made by the vehicle consumer, a vehicle order is also made up of selections made by the vehicle manufacturer as a result of the customer selections. For instance, if the vehicle is being purchased for use in the U.S., the order indicates that the vehicle is a U.S. model vehicle. The country of use dictates inclusion in the vehicle of regulatory-type features such as fuel type (leaded or unleaded), radio frequency, emission-related items (tailpipe and noise emissions), safety-related items (air bags), etc. For example, orders for non-commercial vehicles that are being purchased in the U.S. must also have driver-side air bags selected since all U.S. vehicles now must be equipped with them. As can be readily understood, each previous selection on an order can affect the selections (i.e. families) that follow. For instance, different vehicle-models are available in some but not all countries.

The features, pre-sorted in their families, is the format the features are input into the database 10. Preferably, the families are arranged in the orders and in the database in the perceived optimal sequence for generating vehicle orders. This is done by sequencing the families according to how customers typically choose features while ordering a vehicle. The positioning of the first (initial) families in an order is typically decided by the sales department. These first families are deemed the "important families" of the orders—the families a customer would consider first in filling out his vehicle order, such as vehicle model, engine, etc.

After the "important" families are positioned at the beginning of the order, the "non-important families" (i.e., families not pre-designated by the sales department) are then sequencing in order. This is done by placing "subset-dominated" families, such as those that have prerequisite features in other families (e.g., air conditioning) before the corresponding "superset-dominated" families, such as those that contain prerequisite features (e.g., "super-cooled" radiators). This sequencing of the non-important families is typically done by the processor 100, based upon the product rules.

For example, a computer program can determine from the product rule that air conditioning requires a super-cooling radiator. Thus, the computer program can determine that the air conditioner (i.e., the set of vehicles that have this feature) is a subset of super-cooling radiator (i.e., the set of vehicles that have this feature). Correspondingly, the super-cooling radiator is a superset of the air conditioner. Therefore, when comparing the air-conditioner family with the super-cooling-radiator family, the program can determine that the air-conditioner family is more subset-dominated than the super-cooling-radiator family. Similarly, the program can determine that the super-cooling-radiator family is more superset-dominated than the air-conditioner family. This means that the preferred sequencing would place the air-conditioner family before the super-cooling-radiator family. By placing the subset-dominated families before superset-dominated families, the program obtains more specificity earlier in the process of creating an order. The increased specificity tends to prevent the order generator from pursuing a non-productive sequence.

While the consumer has many different features from which to choose, the consumer may also have limitations in the features he selects placed upon him by the product rules of the vehicle line. These product rules, are inputted into the database along with the features 10. The product rules are the physical relationships that exist between various features. These product rules come about from the physical relationships that a particular family has with other families. These relationships can indicate a requirement (i.e., by selecting a first feature, a second feature is automatically selected) or a restriction (i.e., by selecting a first feature, a second feature is automatically precluded). Essentially, the product rules define which features a consumer may be able to choose by defining those features that he is not able to choose by virtue of selecting another feature (i.e., restrictions), and those that he must choose by virtue of selecting another feature (i.e., requirements). Thus, the product rules identify the available feature selections a consumer has available to him while filling out his order as dictated by one or more features that he previously selected on his order.

An example of a restriction is when a consumer picks a particular type of drive, such as two-wheel drive, often times he is not able to have certain suspensions, such as auto-adjustable suspension.

A requirement occurs when the relationship is mandatory. An example is when the consumer picks air conditioning as a feature, the vehicle must also have a super-cooling type of radiator. Thus, by picking air conditioning, the consumer is also picking the super-cooling type of radiator, whether or not the consumer knows it. The product rules might also dictate more complex mandatory combinations of features.

For example, premium stereo might require premium speakers whenever the customer selects luxury trim. In this case, it is the selection of premium stereo with luxury trim (and not the selection of premium stereo alone) that dictates premium speakers (with non-luxury trim, the rules might permit selection of premium stereo with non-premium speakers). Essentially, a requirement is a mandatory feature combination that requires the implicit or explicit selection of a plurality of features by the explicit selection of at least one feature.

After the features and product rules have been input into the computer database 10, the best available predetermined sales forecast for the individual vehicle features are then inputted into the computer database 20. These predetermined feature forecasts constitute the best available estimates of what percentage of the consuming public would want a particular feature in a vehicle. Since there are typically between 100–300 customer-selected features in each vehicle, it is impractical, and unnecessary, to generate these predetermined feature forecasts for each and every feature.

These predetermined feature forecasts are typically provided by the sales department. The sales department typically predetermines these feature forecasts based on historical data and other information available to it, such as the amount of promotions that are expected to be advertised with respect to particular features, and the anticipated consumer trends in ordering particular types of features.

It is unnecessary to project sales forecasts for all features. Because of the constraints imposed by the product rules, the customer, having already chosen some features during the preparation of an order does not have free choice in choosing other features. In other words, some features become "locked in". For example, having chosen an air conditioner, the customer does not have freedom to choose the type of radiator; instead he (or the manufacturer on his behalf) must choose a super-cooling radiator. The super-cooling radiator feature is a superset of the air-conditioner feature. Because of its capability to use the product-definition structures, the present invention can accurately derive forecasts for dependent features and does not need forecasts for these features.

The forecasts for the features which do not have predetermined feature forecasts are then determined by the processor 100 through program logic. Typically, about 50–80% of the features (between about 75–225 features) do not have forecasts determined by the sales department. A processor 100 accesses (reads) the information (the predetermined feature forecasts, the available features, and the product rules) in the data base (memory) and generates ranges or estimated feature forecasts for the features which do not have known feature forecasts. This is done iteratively by running a program that calculates, for each non-predetermined feature forecast, upper bounds based on super-sets of the feature and lower bounds based on sub-sets of the feature.

For example, assume the forecast for the air conditioner feature has been predetermined to be 60% and no forecast for the super cooling radiator feature has been predetermined. Because the product rules indicate that the air condition is a subset of super-cooling radiator, the processor 100 knows that the super-cooling radiator forecast must be greater than or equal to 60%. The air conditioner forecast supplies a lower bound for the super-cool radiator forecast. Alternatively, if the super-cooling radiator had a predetermined forecast of 70%, the processor 100 would know that the air conditioner. forecast must be less than or equal to 70%. The super-cool radiator forecast supplies an upper bound for the air conditioner forecast. Any feature may, through its various subset and superset relations with other features, have many upper and lower bounds. These bounds may be used in the following manner to derive forecasts for all features that did not have input forecasts:

The "global lower bound" for a feature is the greatest of all its individual lower bounds. This global lower bound is also an upper bound for all subsets of the feature.

The "global lower bound" for a feature is the least of all its individual upper bounds. This global upper bound is also a lower bound for all supersets of the feature.

If a feature's global lower bound equals its global upper bound, then the feature's "provisional forecast" equals the common value.

Any time a new bound is established for a feature, the processor can use this to establish additional bounds for other features. After continuing in this manner until no further bounds or provisional forecasts can be derived, the processor can calculate "final forecasts" ranges for all features by normalizing, within each family, the provisional forecasts (of those features that have them) and global upper bounds (of those features that have them and do not have provisional forecasts). The processor 100 will assign to any feature that has neither an input forecast nor a derived forecast a value to "balance" the feature's family. For example, if, at the end of the forecast-derivation process, family A, which consists of five features, has the following forecasts: A1=15%, A2=25%, A3=none, A4=none, A5=none. Then, the system will assign balancing forecasts as follows: A3=20%, A4=20%, A5=20%.

After the data has been input into the computer database 10 and 20 and the feature forecast ranges have been determined, the processor 100 generates a substantial sample of vehicle orders based on the feature selections, the product rules, the predetermined feature forecasts and the calculated feature forecast ranges 30. The substantial sample of vehicle orders is generated by running a program which, based on the inputted data (available features, product rules, and predetermined features forecasts as well as the generated or calculated, feature forecasts), generates vehicle orders that are representative of actual future vehicle orders.

Each sample order is generated on a random basis according to the inputted and generated sales forecasts while keeping in mind the available features and product rules. For instance, if 30% of people are forecasted as desiring to have air conditioning, then approximately 30% of the sample orders will have air conditioning selected. This random generation of the sample orders is dynamic in that the probability that a particular order will have a particular feature selected varies depending upon the percentage of previous orders that have selected that particular feature. For example, if the inputted sales forecast data indicates that 30% of consumers will select air conditioning, and 35% of the previous orders have selected air conditioning, then for the subsequent vehicle order, the chance that air conditioning will be selected will have a less than 30% probability. This dynamic adjustment of the probability of selecting a particular feature occurs for each feature having a forecast either inputted into the database or derived from the inputted information.

The random sample of orders can be generated using a Monte Carlo type of computer selection program. A preferred computer program operates in the following manner to generate orders:

[1] (iterate) Perform steps [2] through [6] until either the prescribed quota of orders has been generated or the prescribed number of trials has been attempted.

[2] (order trial) Attempt to generate a complete order. Such an order has one feature selected for each and every family of the order. Visit the families in the predefined sequence. Perform steps [3] through [6] for each family.

[3] (visit a family) Mark those features that are valid (i.e., available features according to the product rules) considering the features already placed in the order. Adjust the probability of a feature to reflect feature validity. If a feature from this family has been "set in" (see step [5]), select this feature as the first candidate; otherwise, use the adjusted probability to select the first candidate.

[4] (evaluate a feature) If the current candidate is valid according to the product rules, place it into the order and proceed to step [5] to consider possible set-ins. Otherwise, choose a "subsequent" candidate using an efficient quasi-random heuristic selection process based on the theory of "relatively-prime numbers"; and repeat step [4]. If no candidate is valid, reject the partially completed order and proceed to step [2] to begin a new trial.

[5] (consider possible set-ins) Place all supersets of the selected candidate into empty slots in the order as "set-ins", provided those slots occur later in the optimized sequence than the current family's slot. If the current family is the last family, proceed to step [6] to output the completed order; otherwise proceed to step [3] to visit the next family

[6] (output the completed order) After outputting the completed order, update the probabilities to reflect the degree of success or failure in meeting each features's desired probability. These probabilities should closely agree with the feature forecasts.) Features whose current proportions in output orders fall below their original probabilities have their current probabilities raised. Features whose current proportions in output orders lie above below their original probabilities have their current probabilities lowered. Proceed to step [2] to begin a new trial.

Once the sample of vehicle orders has been generated, the vehicle manufacturer can then ascertain from the completed vehicle orders what parts it will need to manufacture the customer's vehicle, and in what quantity. This can be done by comparing the feature selection made in each order to a bill of materials (BOM).

A BOM is a relationship between the features selected on an order and the parts required to manufacture the vehicle pursuant to the order. The BOM identifies which part, or parts, are needed to satisfy each particular usage condition. A usage condition is a feature or a combination of features. An example of a usage condition would be, if the vehicle order indicates that the vehicle is to have air conditioning and a stereo with a CD-player, then the instrument panel for the vehicle must be part X. The manufacturer would then require the instrument panel identified as part X for that vehicle for installation in the vehicle. Therefore, the generated orders are used in the process of calculating part quantities.

As can typically be the case, the features selected on the orders, when totaled, do not exactly correspond to the feature forecasts inputted. If this is the case, the orders are then weighted so that the sum of the orders that have targeted features, when totaled, correspond essentially identically to the targeted feature forecasts. A targeted feature forecast is similar to a feature forecast, and in fact, all targeted feature forecasts are a subset of the feature forecasts. A targeted feature forecast is a forecast of a feature that is deemed to be important by the sales department.

To illustrate the weight-calculation process, let us assume that air conditioner (call it feature A1) is forecasted at 70%, premium stereo (call it feature B1) at 40%, and luxury trim (call it feature C1) at 30%. Assume further that the (unweighted) proportions in the generated sample of orders are A1=67%, B1=42%, C1=29%. Also assume that all three features were chosen to be targeted, i.e., their forecasts were considered sufficiently important for consideration in the process that calculates the final weight factor for each order.

Then the sub-product $$(70/67) \times (40/42) \times (30/29) = 1.029$$

would enter into the calculation of the weight of any order that contained all three features (A1, B1, C1). (These particular orders would, in general, contain other targeted features, which would contribute their own factors to the weight calculation. In fact, each of an order's targeted features contributes a factor in the calculation of the order's weight. The calculation, which proceeds iteratively, also uses the order's weight from the prior iteration as an additional factor; in the first iteration, the calculation uses the weight placed into the order by the order generator as the additional factor.)

Examining one of these orders in greater depth, we will assume for simplicity that the weight placed into the order by the order generator equals 1.0. Similarly for simplicity, we will also assume that the sub-product corresponding to all of the order's other targeted features (i.e., other than A1, B1, C1) equals 1.0. Then the order's new weight, at the end of the first iteration, will equal $$(1.0) \times (1.029) \times (1.0) = 1.029$$

The order's new weight (1.029 versus its prior weight of 1.0) will change the weighted proportions of features A1, B1, C1 in the sample of orders. This, in turn, will contribute to a change of denominators used in the calculation of the A1×B1×C1 sub-product for the next iteration, leading to a new weight of this order in that next iteration.

After several iterations of these calculations, each order's weight ceases to change very much, resulting in a final weight for each order. The final weighting has the property that the weighted proportion of each targeted feature equals its target forecast.

Then, after the weighting of the orders, each weighted order is reviewed, by the processor 100 to ascertain the usage conditions generated by the vehicle order. The computer processor 100 uses the weighted orders to determine the volume required for each part. Accomplishing this requires the capability to connect each order with the parts needed to assemble the order. This can be done in either one step (using a "structured" BOM) or in two steps (using a "non-structured" BOM). As used here, the term "structured" implies the capability of creating and storing the complete structure of parts that are required to assemble each possible vehicle order. This capability is generally feasible only with a very simple vehicle line (i.e., one that severely limits customer choices of features). We will describe both the one-step process and the two-step process commonly used by North American automobile manufacturers.

In the one-step process, the BOM directly connects each order with a list of the parts required to assemble the order.

The process simply adds the weight of each order to each of the parts on the order's list of parts. When the process ends, each part will have a total weight that corresponds to the whole order sample. Then, if the total weight of all orders in the sample amounted to x% of the total expected planning volume for the vehicle line, each part weight would be multiplied by the reciprocal of x% to determine the volume of the parts necessary for the entire vehicle line.

In the two-step process, the BOM connects each weighted order with a list of "usage conditions" and each "usage condition" with a list of parts, thereby indirectly connecting each order with a list of the parts required to assemble the order. Performing the two-step process requires two computer sub-processes: (1) propagation from orders to usage conditions and (2) propagation from usage conditions to parts. To facilitate the explanation of this, let us first examine the role of the usage condition (or "UC"):

Each part has a "usage list", i.e., a list of conditions that require (i.e. "uses") the part in the assembly of the orders that contain the conditions. Each usage condition ("UC") represents either a single feature (like Air Conditioner) or a combination of two or more features (like Air Conditioner with Power Windows). The UC corresponds to a particular set of possible vehicles that can be assembled.

For example, a wiring-harness part might have a usage list that contains the UC "Air Conditioner with Power Windows." This means the manufacturer needs the wiring harness part in the assembly of all vehicles that have both the Air-Conditioner feature and the Power-Windows feature.

To propagate from the weighted orders to the U.C.'s, the first sub-process must first match each order to the set of UC's. Whenever a UC matches an order (the UC "Air Conditioner with Power Windows" matches all orders that contain both features), then the sub-process must add the order's weight to the UC. When the sub-process ends, each UC will have a total weight that corresponds to the whole order sample.

To propagate from the weighted UC's to parts, the second sub-process simply adds the weight of each UC to each of the parts that have the UC on the part's usage list. When the sub-process ends, each part will have a total weight that corresponds to the whole order sample. Then, if the total weight of all orders in the sample amounted to x% of the total expected planning volume for the vehicle line, each part weight would be multiplied by the reciprocal of x% to determine the volume of parts necessary for the entire vehicle line.

The required parts and their volumes, once determined, can then be forwarded to each supplier responsible for a particular part so they can plan accordingly and supply the automobile manufacturer with the proper amount of parts when it deems necessary. The supplier, with this information in hand, can then estimate, and plan accordingly, for supplying the automobile manufacturer with the necessary parts in the proper quantity.

Figure 2:
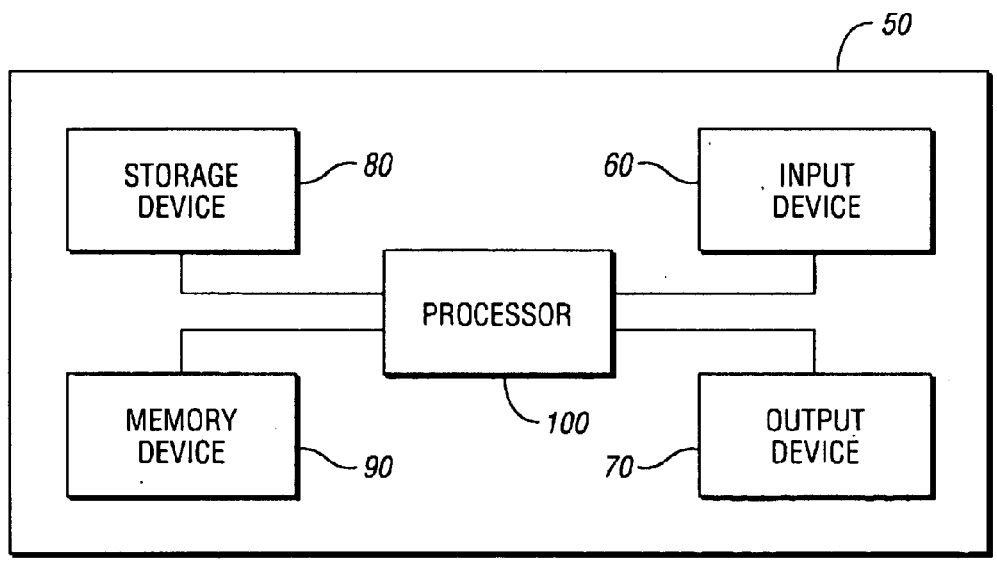
FIG. 2 illustrates a block diagram providing an overview of the system of the present invention.

Practicing the present invention requires use of a computer system 50, as depicted in FIG. 2. The computer system 50 includes an input device 60 for inputting data [such as features, feature forecasts, targeted-feature forecasts, product rules, bill of materials (parts and usage conditions), programs, etc.] into the system 50 and an output device 70 for outputting data (weighted orders, weighted usage conditions, parts with capacity planning volumes) from the system 50. The system 50 also includes a storage device 80 for storing permanent data (such as copies of all inputs, generated orders, usage conditions, parts, and other data that may be needed to trouble-shoot the operation of the system) and a memory device 90 for storing temporary data (such as reformatted versions of the input data as needed to carry out the individual steps of the process and to facilitate efficient and speedy execution of the computer programs). The computer system 50 provides a processor 100 which is connected to the devices 60, 70, 80, and 90. The processor 100 directs the system 50 to carry out the individual steps of the invention, concluding with the determination of the quantities of all the parts necessary to assemble all the vehicles of a vehicle line for a substantial period of time, such as one to three years, in the future in the manner described above.

Although a specific embodiment of the invention is disclosed, modifications may be made by persons skilled in the art without departing from the invention. All such modifications and all equivalents are within the scope of the claims.

What is claimed is:

1. A method for accurately forecasting the quantity of all parts necessary to assemble all vehicles of a vehicle product line for a predetermined time period, the method comprising:

inputting the available features and product rules for vehicle orders of the vehicle line into a computer data base;

inputting sales forecasts for a first plurality of features of the vehicle line into the computer data base;

randomly generating a substantial sample of vehicle orders based on the features, product rules, and the feature sales forecasts; and determining the quantity of all parts necessary to assemble all vehicles of a vehicle product line for a predetermined time period based on the sample of orders, wherein the step of determining the quantity of all parts to assemble all of the vehicles of a product line for a predetermined time period comprises computing a weighting factor for each order, and summing the weighted orders, such that the weighted sums of the orders with respect to designated target features equals the forecasts for the targeted features and determining the quantity of all the parts necessary to physically assemble the vehicles of the order sample and multiplying the quantities by a factor that will convert the quantity of all the parts necessary to assemble all the vehicles of the order sample to the quantity of the parts necessary to physically assemble the vehicles of the product line for the predetermined time period.

2. The method of claim 1, wherein inputting the features and product rules for a vehicle line into a database comprises inputting a plurality of families into the database, each family representing all of the available selections with respect to a particular type of feature.

3. The method of claim 2, wherein randomly generating a substantial sampling of orders comprises generating a plurality of orders wherein each of the order has only one feature selected in each family.

4. The method of claim 2, wherein the step of randomly generating a substantial order sample comprises generating complete orders based on the features, product rules, and dynamic adjustment of the sales forecasts of the first plurality of features.

5. The method of claim 1, wherein the factor comprises the total number of vehicles of the product line for the predetermined time period over the total number of orders in the order sample.

6. The method of claim 1, further comprising generating feature forecasts for a second plurality of features based on the inputted features, product rules and the feature forecasts for the first plurality of features.

7. The method of claim 6, wherein the step of randomly generating a substantial order sample comprises generating complete orders based on the features, product rules, and dynamic adjustment of the sales forecasts of the first plurality of features and of the generated feature forecasts for the second plurality of features.

8. The method of claim 1, wherein determining the quantity of all parts necessary to assemble all vehicles of a vehicle product line for a predetermined time period comprises identifying the quantity of each usage conditions met in the generated orders, each usage condition indicating at least one part that is necessary for a vehicle when that usage condition is present, then converting the quantity of usage conditions into a quantity of parts represented by the quantity of usage conditions.

9. The method of claim 1, wherein the step of randomly generating a substantial sample of vehicle orders is performed using a processor.

10. A system for accurately forecasting the quantity of all parts necessary to assemble all vehicles of a vehicle product line for a predetermined time period, the system comprising:

a storage device operable to store permanent data;

a memory device operable to store a computer program and temporary data;

an input device operable to provide an interface with the system to input available features and product rules for vehicle orders of a vehicle line and sales forecasts for a first plurality of features for a vehicle line;

an output device operable to provide an interface with the system to output the quantity of all parts necessary to assemble all vehicles of a vehicle product line for a predetermined time period parts available; and a processor coupled to the storage device, the memory device, and the input and output devices, the processor operable to execute the computer program such that the system is directed to:

randomly generate a substantial sample of vehicle orders based on the features, product rules and the feature sales forecasts; and determine the quantity of all parts necessary to assemble all vehicles of a vehicle product line for a predetermined time period based on the sample orders, wherein the step of determining the quantity of all parts to assemble all of the vehicles of a product line for a predetermined time period comprises computing a weighting factor for each order, and summing the weighted orders, such that the weighted sums of the orders with respect to designated target features equals the forecasts for the targeted features and determining the quantity of all the parts necessary to physically assemble the vehicles of the order sample and multiplying the quantities by a factor that will convert the quantity of all the parts necessary to assemble all the vehicles of the order sample to the quantity of the parts necessary to physically assemble the vehicles of the product line for the predetermined time period.

11. The system of claim 10, wherein determining the quantity of all parts necessary to assemble all vehicles of a vehicle product line for a predetermined time period comprises identifying the quantity of each usage conditions met in the generated orders, each usage condition indicating at least one part that is necessary for a vehicle when that usage condition is present, then converting the quantity of usage conditions into a quantity of parts represented by the quantity of usage conditions.

12. The system of claim 10, wherein inputting the features and product rules for a vehicle line into a database comprises inputting a plurality of families into the database, each family representing all of the available selections with respect to a particular type of feature.

13. The system of claim 12, wherein randomly generating a substantial sampling of orders comprises generating a plurality of orders wherein each of the order has only one feature selected in each family.

14. The system of claim 12, wherein the step of randomly generating a substantial order sample comprises generating complete orders based on the features, product rules, and dynamic adjustment of the sales forecasts of the first plurality of features.

15. The system of claim 10, wherein the factor comprises the total number of vehicles of the product line for the predetermined time period over the total number of orders in the order sample.

16. The system of claim 10, further comprising generating feature forecasts for a second plurality of features based on the inputted features, product rules and the feature forecasts for the first plurality of features.

17. The system of claim 16, wherein the step of randomly generating a substantial order sample comprises generating complete orders based on the features, product rules, and dynamic adjustment of the sales forecasts of the first plurality of features and of the generated feature forecasts for the second plurality of features.

18. The system of claim 10, wherein the computer program operates to randomly generate the substantial sample of vehicle orders.

* * * * *